United States Patent [19]

Skinner et al.

[11] Patent Number: 4,984,078
[45] Date of Patent: Jan. 8, 1991

[54] SINGLE CHANNEL NTSC COMPATIBLE EDTV SYSTEM

[75] Inventors: Kenneth R. Skinner, Jefferson City, Tenn.; Joseph P. Bingham, Indianapolis, Ind.

[73] Assignee: North American Philips Corporation, New York, N.Y.

[21] Appl. No.: 239,740

[22] Filed: Sep. 2, 1988

[51] Int. Cl.$^5$ .................. H04N 7/01; H04N 7/04; H04N 11/20; H04N 11/06

[52] U.S. Cl. ...................... 358/141; 358/11; 358/12; 358/140

[58] Field of Search ............. 358/11, 12, 140, 141

[56] References Cited

U.S. PATENT DOCUMENTS

| | | | |
|---|---|---|---|
| 4,521,803 | 6/1985 | Gittinger | 358/12 |
| 4,551,754 | 11/1985 | Meise et al. | 358/180 |
| 4,622,577 | 11/1986 | Reitmeier et al. | 358/11 |
| 4,652,904 | 3/1987 | Van der Polder | 358/12 |
| 4,661,850 | 4/1987 | Strolle et al. | 358/140 |
| 4,672,443 | 6/1987 | Dischert et al. | 358/140 |
| 4,677,483 | 6/1987 | Dischert et al. | 358/11 |
| 4,694,337 | 9/1987 | Lyons | 359/11 |
| 4,698,673 | 10/1987 | Johnson | 358/11 |
| 4,831,441 | 5/1989 | Ando | 358/11 |

FOREIGN PATENT DOCUMENTS 2649618 5/1978 Fed. Rep. of Germany ...... 358/140

OTHER PUBLICATIONS

"DICE: The First Intercontinental Digital Standards Converter" by Baldwin et al.-The Royal Television Society Journal; vol. 15, No. 5, pp. 140–159 Sep.-Oct. 1974.

"Standards Conversion of a Videophone Signal with 313 Lines Into a TV Signal with 625 Lines", by M.C.W. van Buul et al., Philips Res. Rept. 29, pp. 413–428, 1974.

"Digital Standards Converter by Adaptive Intra--Frame Line Interpolation"; by Kinuhata et al. IEEE 1978 pp. 1413–1420.

"Fall Screen TV Standards Converter: Changes American to European Standards Without Reducing Picture Size and Allows Output to be Locked to Local sources" by Davies, BBC Research Dept.

"An Extended Definition Television System Using Quadrature Modulation of the Video Carrier with Inverse Nyquist Filter," by Yoshio Yasumoto, et al., IEEE Transactions on Consumer Electronics, Aug. 1987.

Primary Examiner—John W. Shepperd
Assistant Examiner—Michael D. Parker
Attorney, Agent, or Firm—Michael E. Marion

[57] ABSTRACT

An extended definition television (EDTV) system transmits, receives and displays both EDTV and NTSC signals using a NTSC channel bandwidth. The system procudes an EDTV broadcast signal having a picture with a 16:9 aspect ratio and at least one adjacent horizontal border to produce an overall image apsect ratio of 4:3. Picture information is also selectively modulated onto the horizontal border. The EDTV broadcast signal is transmitted in a NTSC format, and a receiving circuit is provided comprising a display with a 16:9 aspect ratio, a detector for determining whether an EDTV or other type of signal is being received, and an expansion circuit responsive to the detector to produce an expanded picture for display. When an EDTV signal is received, it is expanded and filtered vertically and is expanded horizontally and the 16:9 picture is displayed on the 16:9 display. The receiving circuit derives picture information from both the picture portion and the border portion of the EDTV signal. When an NTSC signal is received, it is displayed on the 16:9 display with at least one vertical border so that the NTSC picture has a 4:3 aspect ratio. The EDTV signal is also compatible with and may be received and displayed on standard NTSC receivers as a 16:9 picture with at least one horizontal border.

3 Claims, 6 Drawing Sheets

SINGLE CHANNEL NTSC COMPATIBLE EDTV SYSTEM

BACKGROUND OF THE INVENTION

Present United States television receivers display an image with an aspect ratio of 4:3. This standard was developed by The National Television System Committee (NTSC). The aspect ratio developed for use in motion pictures is 16:9, and presently, the industry is working to produce a television transmission and reception system compatible with an aspect ratio of 16:9.

The present NTSC system also uses a scanned image that is interlaced. An interlaced scan has well-known shortcomings that have been addressed with systems such as the High Definition Broadcast (HDTV) System, but most HDTV signals cannot be used by present NTSC television receivers. Also, in some proposed systems NTSC television signals cannot be displayed on HDTV receivers.

SUMMARY OF THE INVENTION

In a preferred form of the present invention an extended definition television (EDTV) system provides progressively scanned EDTV signals that may be displayed on NTSC television receivers, and NTSC signals may be displayed on an EDTV receiver. Also, in the preferred embodiment progressively scanned EDTV signals are displayed on an EDTV receiver with increased vertical resolution over NTSC signals received on a NTSC receiver.

The source image of the EDTV system is a progressively scanned image with an aspect ratio of 4:3. There is a picture portion of the image which has an aspect ratio of 16:9 and a horizontal border portion of the image which fills out the image to the aspect ratio of 4:3. The source image is progressively scanned with 480 lines (360 lines for the picture portion and 120 lines for the border portion) with a horizontal scan rate of 26 microseconds per line. The NTSC standard source signal is scanned with 240 lines and a horizontal scan rate of 52 microseconds per line. In order for the EDTV signal to be compatible with the NTSC system, the source image must be processed further.

Two signal components are formed and assembled for transmission within a single NTSC channel. The first signal component (I) is formed by selecting alternate lines from the source (called vertical down-sampling) and time expansion (called scan conversion) in the horizontal direction. The second signal component (Q) is composed of line differential information which is formed by finding the difference between a line and the average of the two adjacent lines. The Q component is then vertically-down-sampled and scan converted in a manner similar to the I component. The two component signals (I and Q) contain all of the information from the original source signal. Both components are compatible with the NTSC standard, but there is only enough room in the NTSC bandwidth to send one complete signal.

In order to transmit additional information within a single NTSC channel, a method of in-phase and quadrature modulation of the picture carrier is used. The I component is used to modulate the in-phase portion of the carrier in a manner identical to that presently used to modulate NTSC carriers. In addition, the carrier contains quadrature side bands. These side bands are only 1.25 MHz wide, where the in-phase portion is 4.2 MHz wide. Only a portion of the Q component may be modulated onto the quadrature side band.

The Q component is low pass filtered (LPF) to about 1.25 MHz and then is applied as the quadrature modulating signal of the picture carrier. The LPF Q signal is subtracted from Q to give a high pass filtered (HPF) Q signal. This HPF Q signal may be inserted into the border areas of the I signal. Since there are only ⅓rd as many lines per field in the border areas as there are in the active picture area, it will require three field periods to fully update a scene with HPF Q components. For non-moving portions of a picture this poses no problem. For moving portions of the picture, a motion detector is incorporated at the source of transmission that deletes the "moving" Q signal components from the border areas. The LPF Q signal is used to modulate the quadrature side band and is updated continually; therefore, no motion detector is required for that component. In the preferred embodiment, the Q component picture is separated into a LPF luminance signal, a HPF luminance signal and a LPF color signal. The LPF luminance signal is used to quadrature modulate the picture portion of carrier. The remaining two signals are inserted into the borders. That is, the HPF luminance signal is used for in-phase modulation and the LPF color signal is used for quadrature modulation of the carrier signal border portion. That portion of the Q component color signal having a frequency above the LPF is not transmitted.

At the EDTV receiver, full bandwidth Q signals may be recovered (for non-moving portions) by reassembling LPF and HPF Q signals. The full bandwidth Q signals are then used to recover the lines deleted from the original program source signal. Thus, a progressive scanned display may be achieved that has maximum vertical detail for non-moving pictures.

At a NTSC receiver, only the I components of the source signal can be received. NTSC receivers are designed to filter out the quadrature side bands and, therefore, the LPF Q signal is not detected. The HPF Q signals are still in the border areas of the I signal, however. These HPF Q signals may be "hidden" so that they are not distracting to the viewer. A masking signal such as a pattern in the border area may be used to hide the HPF Q signals so that they are not distracting for the viewer. Alternatively, the black level clamping point may be changed by inserting a pedestal at the horizontal blanking back porch, so that the HPF Q signal peaks are below black (super black).

The signal processing circuits of the EDTV receiver reassemble the various signal components detected by the in-phase and quadrature synchronous demodulators, develop missing line information that was deleted from the original source signal, perform scan conversion, and expand the picture portion of the image to a full 16:9 aspect ratio. Unlike NTSC receivers, an EDTV receiver has two video IF demodulators: one for the in-phase signal and one for the quadrature signal. The I and Q signals may then be obtained, and the original scan signal may be reassembled by appropriate circuitry.

In order to provide a progressively scanned display, the horizontal scan rate of the EDTV receiver is twice that of standard NTSC receivers. The vertical scan rate, however, is the same as standard NTSC. The scan rates of an EDTV display match those of the source signal, but the number of lines containing the picture in the source signal is only ¾ths the number of active lines available; the source signal has 360 lines of picture with 120 lines of border and the display has 480 lines available for picture display. It is desirable to delete the border areas and expand the picture vertically for a correct display of the source picture on the 16:9 aspect ratio screen. The 360 lines of picture are up-sampled in a ratio of 4:3 in order to provide the required vertical expansion to 480 lines. This is accomplished by a vertical filter and field store circuit.

The EDTV receiver may also be used to display a standard NTSC signal. The scan rate of the NTSC standard signal is 52 microseconds; by the use of a horizontal time compression circuit, a scan rate of 19.5 microseconds may be achieved. This scan rate will display a 4:3 aspect ratio picture with at least one vertical border area. A line averaging circuit may be used to up-sample the 240 line picture to a 480 line picture.

A simplification of the transmitter and receiver circuits may be achieved if a trade-off on performance and economic considerations is made. If one notes that the human eye cannot resolve fine color detail, it is not necessary to improve the vertical color resolution over the standard NTSC amount. Therefore, instead of transmitting the line differential color components, the receiver will use adjacent line averaged color components for the missing line. Also, some subjective experiments have shown that the bandwidth for the line differential signals can be significantly reduced. Thus, if one does not include in the transmittal signal the high pass filtered line differential signals, only the low pass line differential signals will be used. If the two above changes are made to the previous system no color or HPF line differential signals are sent in the border areas. This leaves the area free for new usage (such as digital audio). The picture processing circuitry then becomes much simplified.

BRIEF DESCRIPTION OF THE DRAWINGS

The present invention may be best understood by reference to the following detailed description of preferred embodiments when considered in conjunction with the drawings in which.

DETAILED DESCRIPTION OF THE DRAWINGS

Figure 1A:
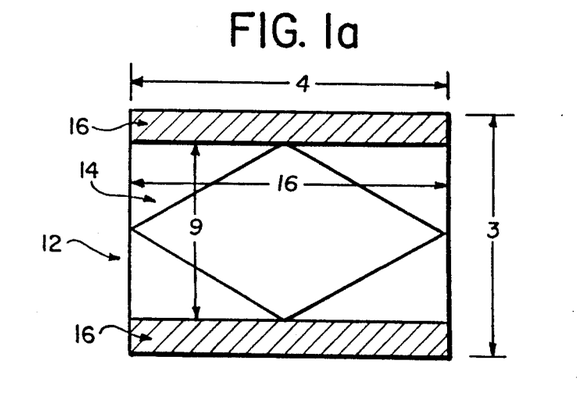
FIG. 1a shows the display of an EDTV signal of the present invention on a NTSC receiver.

Referring now to the drawings in which like reference characters designate like or corresponding parts throughout the several views, there is shown in FIGURE 1a the display of an EDTV signal of the present invention in a preferred form on a NTSC receiver. The NTSC display 12 has an aspect ratio of 4:3. There is also shown an EDTV signal which consists of a picture portion 14 and a border portion 16. The picture portion 14 has an aspect ratio of 16:9 and the border portion 16 fills the NTSC display 12 to a 4:3 aspect ratio.

Figure 1B:
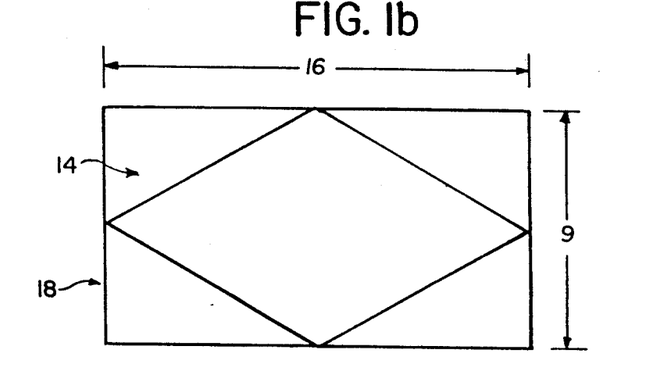
FIG. 1b shows the display of the EDTV signal on an EDTV receiver.

There is shown in FIGURE 1b an EDTV signal of the present invention on an EDTV receiver. The EDTV display 18 has a 16:9 aspect ratio. The picture portion 14 of the EDTV signal fills the entire EDTV display 18. The border portions 16 are not seen on the EDTV display 18.

Figure 1C:
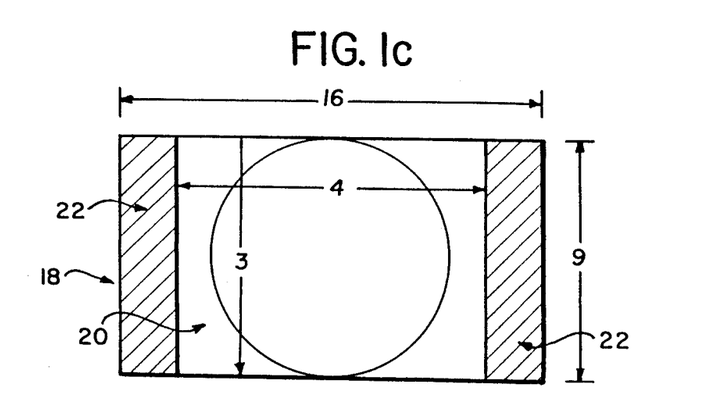
FIG. 1c shows the display of a NTSC signal on an EDTV receiver.

FIG. 1c shows a NTSC signal on an EDTV receiver of the present invention. The picture 20 of the NTSC signal has an aspect ratio of 4:3 and is displayed on the EDTV display 18 with vertical borders 22. Although two vertical borders 22 and two horizontal borders 16 are shown, it is understood that a single border may be used in each case, if preferred.

Figure 2:
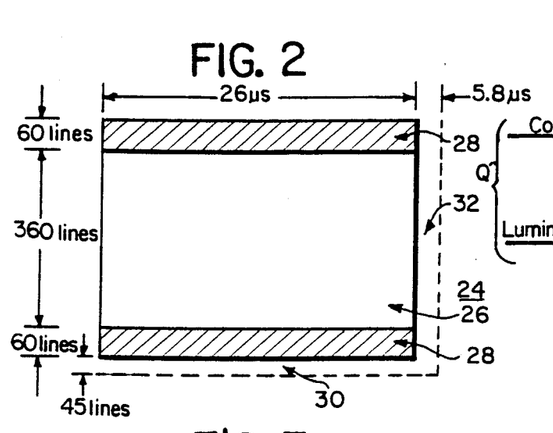
FIG. 2 shows the format of a progressively scanned source image for the EDTV signal.
Figure 3:
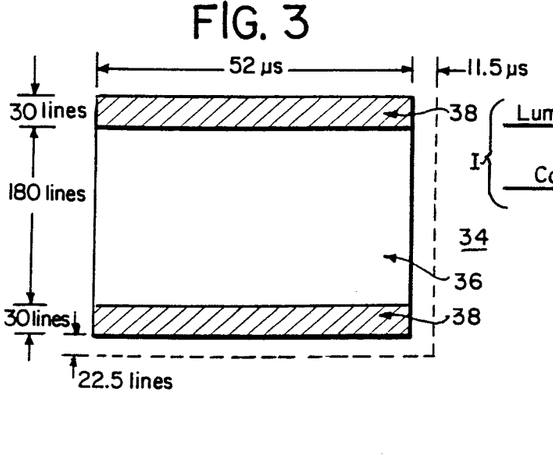
FIG. 3 shows the resulting NTSC compatible signal after the source image of FIG. 2 is processed in accordance with the present invention.

There is shown in FIG. 2 the format of a progressively scanned source image for the EDTV transmission system. Unlike the NTSC system which uses interlaced scanning, the EDTV system uses a progressive scanning of the source image from the top of the image to the bottom of the image. Source image 24 is composed of a picture portion 26 which has a 16:9 aspect ratio and border portions 28 which fills out source image 24 to an aspect ratio of 4:3. Picture portion 26 is composed of 360 video lines and the border area is composed of 120 video lines. The source image also contains a 45 line vertical retrace portion 30. Picture portion 26 and border portions 28 are scanned in the horizontal direction for a period of 26 microseconds. An additional 5.8 microseconds is used for horizontal retrace 32. The progressively scanned source image 24 must be processed to become compatible with the NTSC standard. FIG. 3 shows the source image 24 of FIG. 2 processed to that standard. Source image 34 has a picture portion 36 with a 16:9 aspect ratio and border portions 38 which fill out source image 34 to a 4:3 aspect ratio. Picture portion 36 has 180 lines with the border area having 60 lines. This is one-half the number of lines seen in source image 24 of FIG. 2. The horizontal scan time of source image 34 is 52 microseconds which is twice the horizontal scan time of source image 24 in FIG. 2. The processing of source image 24 of FIG. 2 into source image 34 of FIG. 3 is accomplished with a line differential generation, scan conversion, and vertical down-sampling circuit shown in FIG. 4 and described below.

Figure 4:
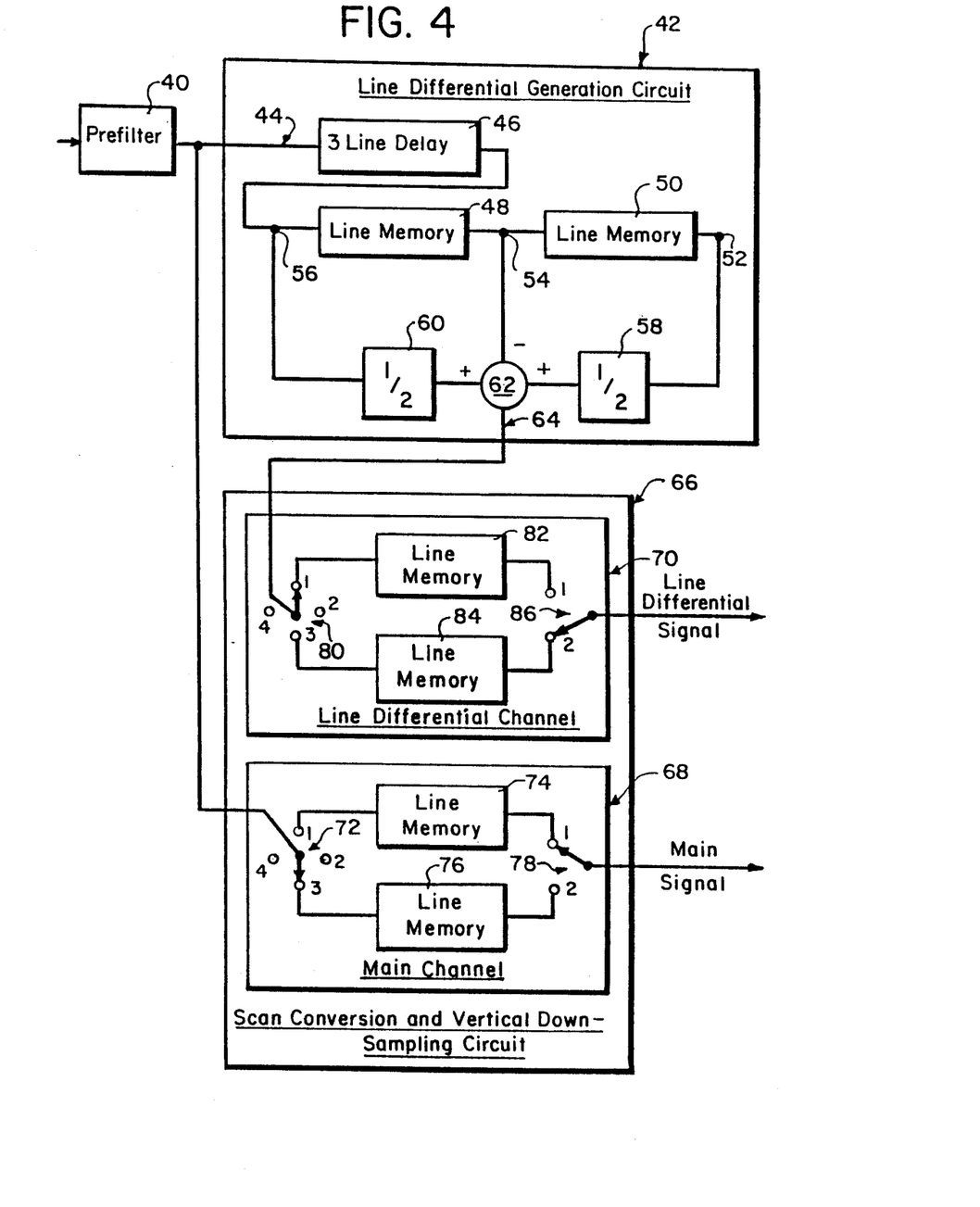
FIG. 4 is a block schematic diagram of the I and Q signal component generation circuit.

FIG. 4 shows a block schematic diagram which contains a scan conversion and vertical down-sampling circuit producing a main signal that matches source image 34 of FIG. 3. The main signal contains only one-half of the information originally in source image 24 of FIG. 2. The line differential generation circuitry of FIG. 4 provides a line differential signal which contains the information missing in the main signal. The main signal plus the line differential signal contain all of the information originally contained in source image 24 of FIG. 2.

Source image 24 of FIG. 2 is read into a vertical low-pass prefilter 40 to remove the unwanted high-frequency components present in the original signal that can cause aliasing following the subsequent vertical down sampling. The signal from prefilter 40 is applied to line differential generation circuit 42. The signal enters circuit 42 on line 44 and is applied to a three line delay 46. The output of three line delay 46 is then applied to line memory 48 and then to line memory 50. At this point a signal from three different lines (a, b, and c) appears at three different points in the circuit. The signal for line a appears at junction 52, the signal for line b appears at junction 54, and the signal for line b appears at junction 56. The signal from line a at junction 52 is applied to divider circuit 58 where the signal is divided in half. The signal from line c at junction 56 is applied to another divider circuit 60 where it also is divided in half. The signal representative of one-half of a and the signal representative of one-half of are applied to adder circuit 62. The signal from line b at junction 54 is subtracted from the added signals representative of one-half a and one-half c. The signal from adder circuit 62 is representative of the difference between the signal of line b and the average of the signals on lines a and c. This line differential signal is applied over line 64 to scan conversion and vertical down-sampling circuit 66. The original signal from prefilter 40 is also applied to scan conversion and vertical-down-sampling circuit 66.

Circuit 66 has two channels. Main channel 68 is used to scan convert and vertical down-sample the original signal, and the line differential channel 70 is used to do the same to the line differential signal. Since both channels operate in an identical manner only one will be described in detail. The original signal from prefilter 40 is applied to main channel 68 at switch 72. Switch 72 is a four position switch which switches between line memories 74 and 76 and open positions. Therefore, only every other line is read into a line memory. Each line is read in at the scan rate of 26 microseconds per line. When switch 72 is at position 1 line a is read into line memory 74. Switch 72 then switches to position 2 and line b is deleted. Then switch 72 moves to position 3 where line c is read into line memory 76. Switch 72 then switches to position 4 and line d is deleted. The switch then moves to position 1 and the cycle starts again with line e. Each line is read out of the line memory at 52 microseconds per line. Switch 78 moves from position 1 where line a is read out and then to position 2 where line c is read out and then back to position 1 where line e is read out and so forth. The output from switch 78 is the I signal.

The line differential signal is scan converted and vertical down-sampled in the same manner as the main signal. Switch 80, line memories 82 and 84, and switch 86 work in concert to produce a line differential signal which has a scan time of 52 microseconds per line. Again, every other line is deleted, but the line differential channel 70 deletes the lines that the main channel preserves. The line differential signal is the Q signal.

Figure 5:
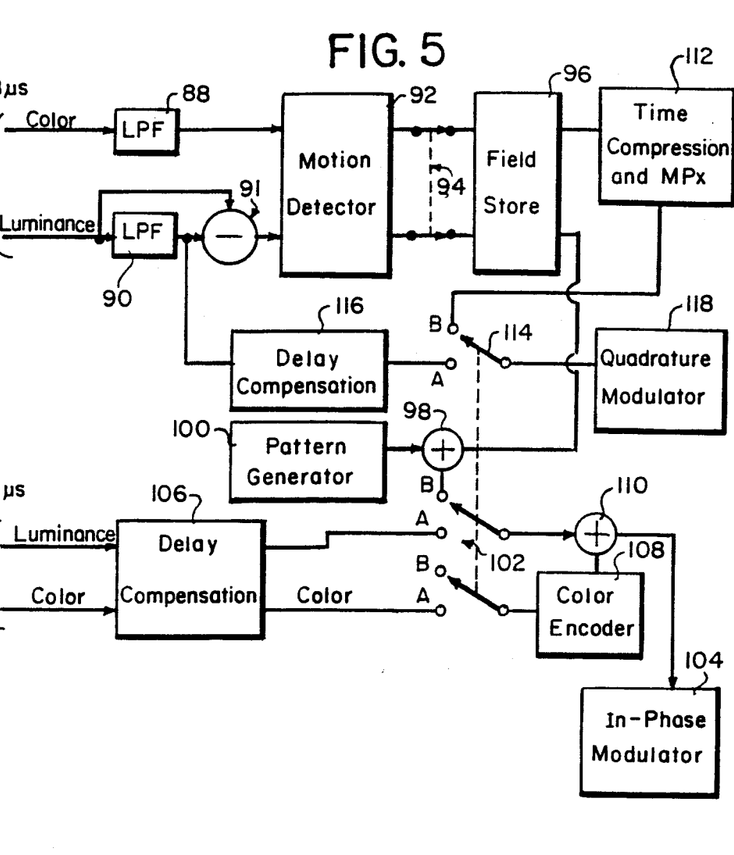
FIG. 5 is a block schematic diagram of the premodulator components of an EDTV broadcast signal transmission system.

There is shown in FIG. 5 a block schematic diagram of the pre-modulator components of an EDTV broadcast signal transmission system. The components of FIG. 5 provide for coding a part of the Q signal into the border areas of the I signal. The border areas are only one-third the size of the picture area so three frames (complete vertical scans) are required in order to contain information from the picture portion of the Q signal in the I signal border and, thus the Q signal is updated only once for every three vertical scans. For this reason, a motion detector is provided to detect motion in the Q signal. If motion is detected, then that portion of the Q signal is blanked. There is also provided a time compression and multiplexing circuit for the color components of the Q signal. This circuit allows the color components to be placed into the border areas of the luminance component of the Q signal. Again, since these areas are only one-third the size of the picture area, these color components are processed by the motion detector circuitry. Various delay compensation circuits are provided to compensate for the processing of the components of the I and Q signals.

The Q signal is divided into its luminance component (Y) and its color components (u, v). The color components are applied from the circuit shown in FIG. 4 to low pass filters 88. Low pass filters 88 are band limited to 0–0.6 MHz. The luminance component is applied to low pass filter 90 which has a band pass of 0–1.25 MHz. The low pass filtered color components are applied to motion detector 92. The low pass filtered luminance component is applied to a subtractor circuit 91 which also is an input of the luminance signal. The output of subtractor circuit 91 is a high pass filtered luminance component. This high pass filtered component is also applied to motion detector 92. Motion detector 92 monitors the components applied to it for indications of motion. During those portions of the signals where motion is indicated, motion detector 92 produces a motion signal to indicate motion in the picture. This motion signal controls switch 94 to blank the color and luminance component signals so that they are deleted from later processing. If there is no motion detected by motion detector 92 the color and luminance components of the signal are applied to field store 96 which can store 60 lines of signal information. The luminance component of the Q signal is then applied to adder circuit 98, and a pattern generator 100 is also be applied to adder 98. Adder 98 and generator 100 provide a pattern for the border areas of the displayed signal to prevent distraction to the viewer of the Q signals encoded in the border of the image. The output of adder circuit 98 is applied to switch 102 which controls the output to in-phase modulator 104.

The color and luminance components of the I signal are applied to delay compensation circuit 106 and then to switch 102. Time period A is the time period when the picture portion of the source image is being sent to the modulator and time period B is the time period when the border portion of the source image is being sent to the modulator. Switch 102 allows the I signal components to be sent to the in-phase modulator 104 for 180 lines when the switch 102 is in position A (referred to as time period A). When switch 102 is in position B (referred to as time period B) the high pass filtered luminance component of the Q signal and the pattern signal is sent to the in-phase modulator 104 for a total of 60 lines per scan. The color components of the I signal are applied to color encoder 108. The color components are then combined with the luminance component of the I signal in adder circuit 110 before being applied to in-phase modulator 104. The high pass filtered luminance component of the Q signal plus the pattern signal is applied from adder circuit 98 through switch 102 to adder circuit 110 and then applied to in-phase modulator 104.

The low pass filtered color components of the Q signal are applied from field store 96 to time compression and multiplexing circuit 112. After being time compressed and multiplexed, the color components of the Q signal are applied to position B of switch 114. Position B of switch 114 is activated only during the 60 lines of border transmission. The low pass filtered luminance component of the Q signal is applied from low pass filter 90 to delay compensation 116 and then to point A of switch 114. When switch 114 is in the A position, the luminance component of the Q signal is applied to quadrature modulator 118.

Therefore the circuitry shown in FIG. 5 provides a means for placing a part of the Q signal into the border areas of the I signal. In addition, the color components of the Q signal are placed into the border areas of the luminance component of the Q signal. A motion detector blanks the portions of the Q signal that are placed into the border areas when motion is detected. After carrier modulation, the I and Q signals are then transmitted for reception by television receivers.

Figure 6:
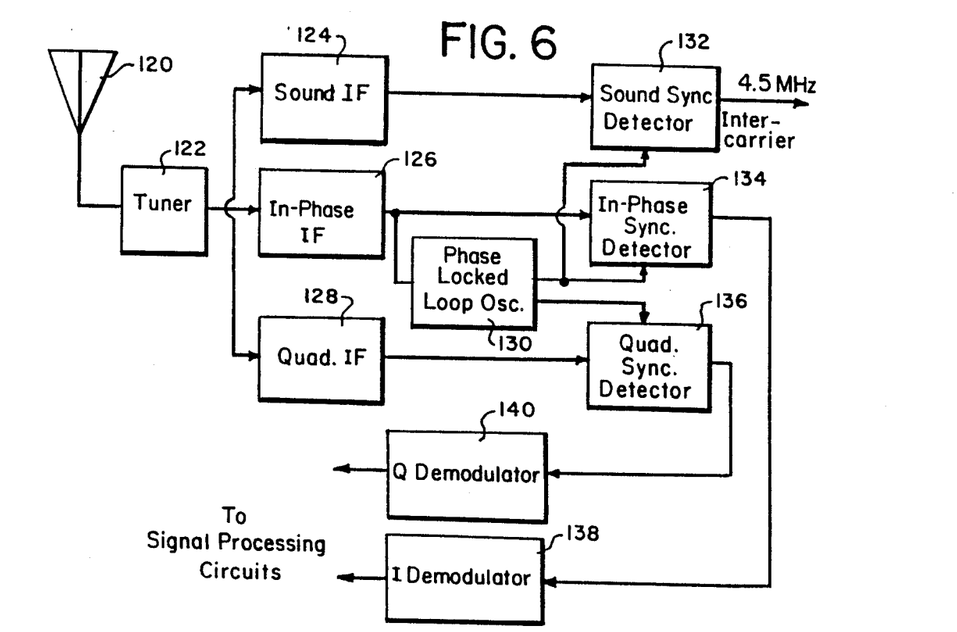
FIG. 6 is a block schematic diagram of the RF, IF, and detector portions of an EDTV receiver.

There is shown in FIG. 6 a block schematic diagram for the RF, IF, and detector portions of an EDTV receiver. These portions operate in a manner similar to similar circuits in NTSC receivers except that there is an additional IF amplifier (and associated circuitry) to process the received quadrature signal. The transmitted signal is received by the receiver at antenna 120. The signal is then sent from antenna 120 to tuner 122. Tuner 122 then applies the signal to sound IF amplifier 124, in-phase IF amplifier 126, and quadrature IF amplifier 128. The signal from in-phase IF amplifier 126 is applied to phase lock loop oscillator 130 which applies a synchronizing signal to sound synchronous detector 132, in-phase synchronous detector 134, and quadrature synchronous detector 136. In-phase synchronous detector 134 applies the in-phase signal to I signal demodulator 138. Quadrature synchronous detector 136 applies the quadrature signal to Q signal demodulator 140. The demodulated signals are then applied to further signal processing circuits of the EDTV receiver.

Figure 7A:
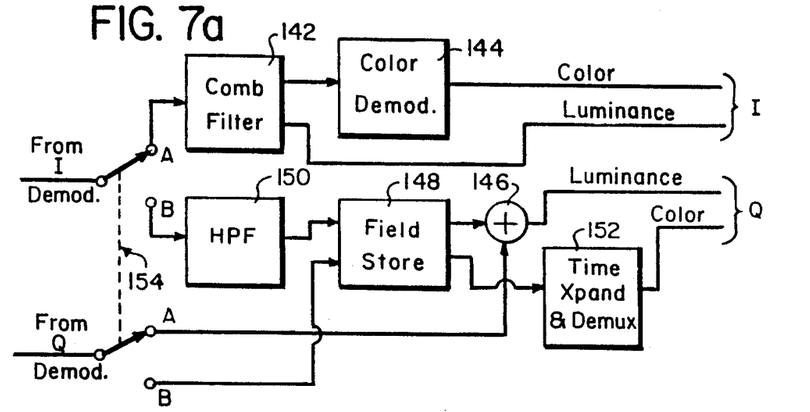
FIGS. 7a and 7b are a block schematic diagram of the signal processing circuits in an EDTV receiver.
Figure 7B:
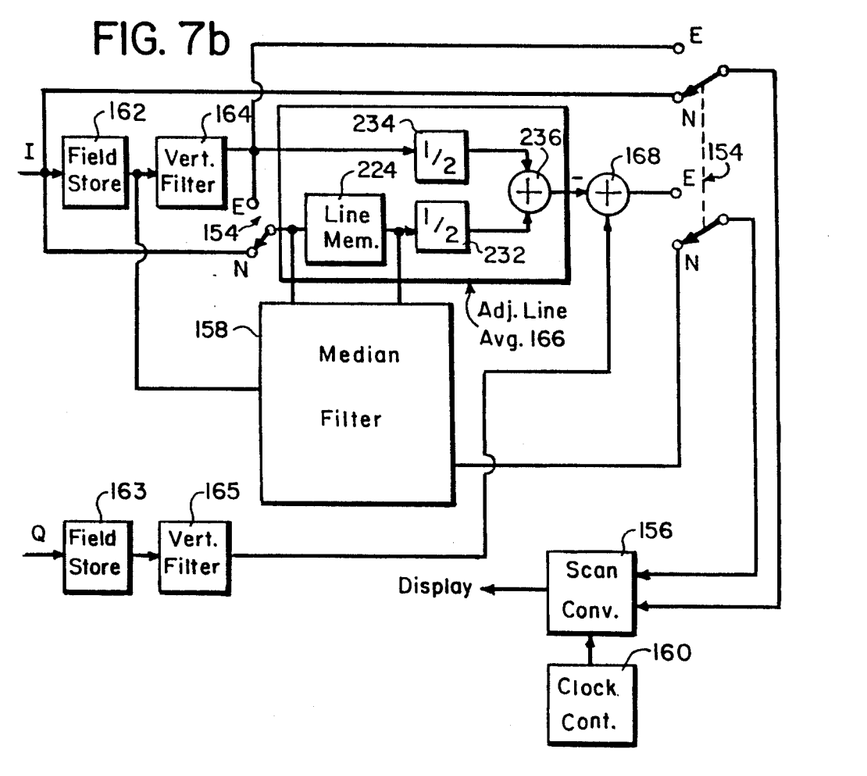

FIG. 7 is a block schematic diagram of the signal processing circuits in an EDTV receiver. These circuits restore the information, in the Q signal, that was deleted from the source image in order to produce the I signal. FIG. 7a shows the reconstruction of the I and Q signals and FIG. 7b shows the combining of the I and Q signals into a signal suitable for display. In FIG. 7a, the signals from in-phase and quadrature demodulators are time gated according to the same switch control sequence as is shown in FIG. 5. During time period A, the in-phase signal is processed by the comb filter 142 and the color demodulator 144 and results in the I signals. Also, during time period A, the signal from the quadrature detector is the low pass filtered luminance line differential component. This component is applied to adder circuit 146 where it is added to high pass filtered luminance line differential components. During B time periods, the field store 148 is fed by the high pass filtered luminance component of the Y signal from high pass filter 150 to update luminance portions of the picture. During time period A, the entire field store is read out providing a complete luminance component of the Q signal. In addition, the color components of the Q signal are read into a time expansion and demultiplexer circuit 152. Thus, the Q signals have been reassembled into their proper locations for the picture.

For NTSC signal reception, the switch 154 is left in position A, and the signals I represent the normal NTSC components. There would be no Q signals developed in this case. Following this case into FIG. 7b, the I signal goes directly to the scan conversion block 156. The missing line information for the progressive scan generation is provided by a median filter circuit 158. Its decision logic determines whether to output adjacent line or previous field information. Scan converter 156 uses a time compression signal from clock controller 160 to compress the horizontal time of the signal.

For EDTV signals, the I and Q signals are expanded vertically in field store blocks 162 and 163 and vertical filters 164 and 165; adjacent line average circuit 166 generates an adjacent line average which is applied to adder circuit 168. The adjacent line average is subtracted from the Q signals at adder circuit 168 to form the missing line information that was originally deleted from the source signal. The scan converter does not perform horizontal time compression in this case so that the picture extends to the full width of the screen.

Figure 8A:
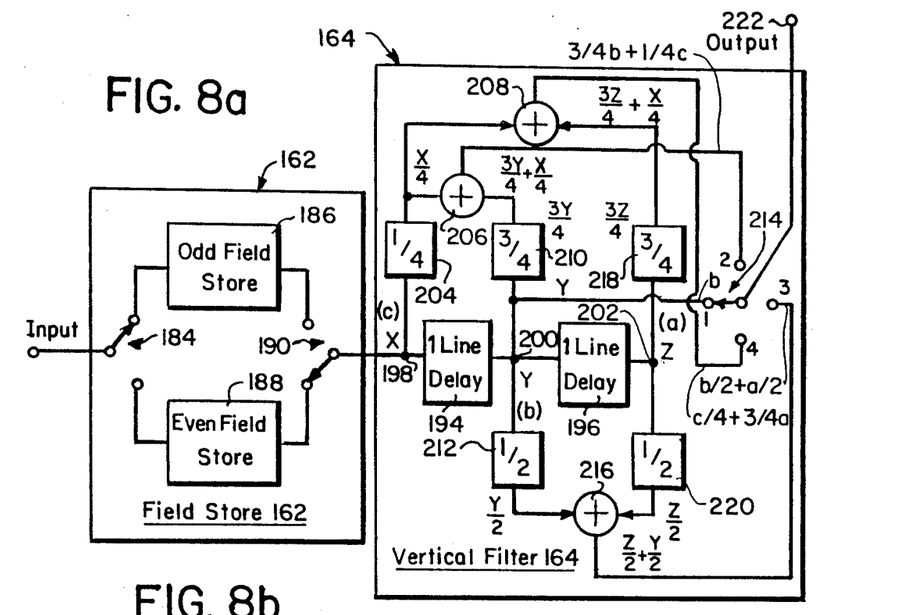
FIG. 8a is a block schematic diagram of the Field Store and Vertical Filter blocks shown in FIG. 7.

FIG. 8a is a block schematic diagram of the Field Store and Vertical Filter blocks (162 and 164, 163 and 165) shown in FIG. 7b. The field store and vertical filter block for both I and Q signals are identical. The circuitry provides a means for expanding three lines of input signal into four lines of output signal. The three lines are averaged in such a way that there is a gradation between groups of three lines. The input signal, either I or Q, is time gated through switch 184 alternately into either odd field store 186 or even field store 188 during the picture portion of the signal. As one field is being read in through switch 184, the other field is being read out through switch 190. The read out of the field stores are controlled to read three video lines and then to produce a null video line signal. Video line signals are applied to one-line delay 194 and then to one-line delay 196.

When three lines have been applied, one line signal (X) appears at junction 198, a second line signal (Y) appears at junction 200, and the third line signal (Z) appears at junction 202. Signal X is applied to quarter divider circuit 204; the X/4 signal is then applied to adder circuit 206 and adder circuit 208. Signal Y is applied to three-quarter divider circuit 210, half divider circuit 212, and position 1 of commutator switch 214. The 3Y/4 signal from circuit 210 is applied to adder circuit 206 where it is added to the X/4 signal to produce a signal equal to 3Y/4+X/4. This signal is then applied to position 2 of commutator switch 214. The Y/2 signal from circuit 212 is applied to adder circuit 216. Signal Z is applied to three-quarter divider circuit 218 and half divider circuit 220. The 3Z/4 signal is applied to adder circuit 208 where it is added to the X/4 signal to produce a signal equal to 3Z/4+X/4 which is then applied to position 4 of commutator switch 214. The Z/2 signal is applied to adder circuit 216 where it is added to the Y/2 signal to produce a signal equal to Y/2+Z/2 which is then applied to position 3 of commutator switch 214. Commutator switch 214 sequentially applies the signals at positions 1,2,3, and 4 to output 222. The signal from output 222 is then processed further by the remaining circuitry of FIG. 7b.

Figure 8B:
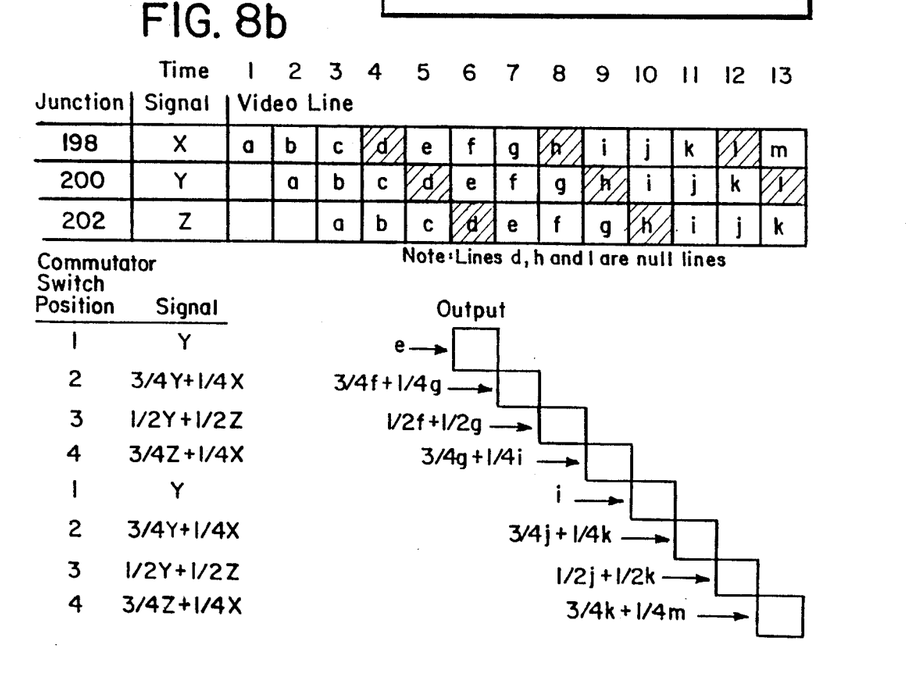
FIG. 8b is a chart depicting the operation of the filter blocks shown in FIG. 7.

In order to facilitate an understanding of the operation of vertical filter 164 or 165, FIG. 8b shows lines that groups of three input appear at junctions 198, 200, and 202 (signals X, Y, and Z respectively). At time 1, video line a is read from even field store 188 to junction 198 (X); at time 2, video line b is read to junction 198 (X) and video line a is read to junction 200 (Y); at time 3, video line c is read to junction 198 (X), video line b is read to junction 200 (Y), and video line a is read to junction 202 (Z). As each new video line is read onto junction 198, the preceding lines are read onto next junctions. Every fourth line (d, h and 1) is a null line, which passes through the circuitry in the same manner as a video line from field store 188 (or 186).

The signal appearing at commutator switch 214 position 1 is Y; position 2 has $3Y/4+X/4$, position 3 has $Y/2+Z/2$; and position 4 has $3Z/4+X/4$. As shown in FIG. 8a, at time 3 the following combinations of input video lines a, b, and c are present at terminals 1, 2, 3 and 4 of commutator switch 214 respectively: b, $3/4b+1/4c$, $b/2+a/2$ and $c/4+3/4a$. The commutator switch 214 is synchronized so that the video line immediately after the null line is at junction 200 when switch 214 is at position 1. FIG. 8b for example, shows that the signal at output 222 at time 7 is weighted combination of video lines f and g, (e.g. $3/4f+1/4g$). At time 8, the output is weighted combination of video lines f and g, (e.g. $f_2+g_2$). At time 9 the output is a weighted combination of video lines g and i, (e.g. $3/4g+1/4i$). At time 10, the output is video line i. At no time does a null video line appear at output 222. Thus, vertical filter 164 and field store 162 operate to expand each three video line group into four video lines with a gradation between the three input video lines.

Figure 9:
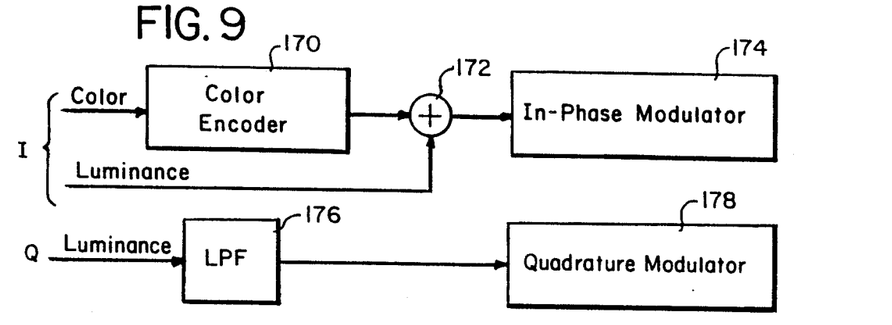
FIG. 9 is a block schematic diagram of a simplified EDTV transmitter.

FIG. 9 shows a block schematic diagram of a simplified EDTV transmitter. The blocks operate in a manner similar to the blocks of the same name shown in FIG. 5. The color components of the Q signal are eliminated prior to transmission. Also, there is no use of the border areas to transmit the luminance portion of the Q signal. The color component of the I signal is applied to color encoder 170 and then to adder circuit 172. The luminance component of the I signal is applied directly to adder circuit 172. The output of adder circuit 172 is then applied to in-phase modulator 174. The luminance component of the Q signal is applied to a 0-1.25 MHz low pass filter 176 which produces a low pass filtered luminance component of the Q signal which is then applied to the quadrature modulator 178. Since the human eye cannot resolve fine color detail, it is not necessary to improve the vertical color resolution over the standard NTSC amount. This circuit shows how the circuitry of FIG. 5 may be greatly simplified.

Figure 10:
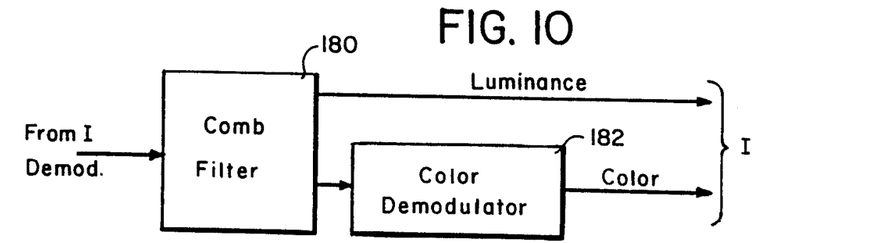
FIG. 10 is a block schematic diagram of a simplified EDTV receiver.

There is shown in FIG. 10 a block schematic diagram of a simplified EDTV receiver. The blocks operate in a manner similar to the blocks of the same name shown in FIG. 7. Using the simplified signal processed by the circuitry of FIG. 9, the I signals are applied directly to comb filter 180 where they are separated into the luminance and color components. The color components are then applied to color demodulator 182. This then produces the completed I signal. Since there is no Q signal in the I components, the luminance component of the Q signal may be directly applied to the rest of the circuitry of the receiver without further processing. Therefore, the circuitry of an EDTV receiver may be greatly simplified.

It may be seen from the foregoing that the present invention provides a means for producing, transmitting, receiving, and displaying an extended definition television signal within the standard NTSC bandwidth. This EDTV signal may be received and displayed by NTSC receivers as well as EDTV receivers. In addition, the EDTV receivers may also receive and display standard NTSC signals. The EDTV signal displayed on an EDTV display has much better vertical resolution than the standard NTSC signal. Although particular preferred embodiments are described above, it will be understood that they are not limiting and the invention is capable of numerous rearrangements, modifications and substitutions of parts without departing from the scope of the invention.

What is claimed is:

1. A vertical expander and filter apparatus comprising:
    input means for receiving a television picture signal comprising a plurality of input video lines;
    output means for producing, for a group of M of said input video lines, M+1 output video lines, where M is a number,
    wherein said output means comprises:
    (a) a first divider circuit having a first coefficient;
    (b) second and third divider circuits having second and third coefficients respectively;
    (c) fourth and fifth divider circuits having fourth and fifth coefficients respectively;
    (d) a first line delay circuit for providing a first delayed video line from a first input video line;
    (e) a second line delay circuit for providing a second delayed video line from a second input video line;
    (f) first, second and third adder circuits;
    (g) a switch comprising first, second, third and fourth terminals; and
    (h) circuit means for interconnecting said divider circuits, said delay circuits and said adder circuits, whereby:
    a third input video line is applied to said first line delay circuit and said first divider circuit;
    said first delayed video line is applied from said first line delay circuit to said second line delay circuit, said second divider circuit, said fourth divider circuit and said first terminal of said switch;
    said second delayed video line is applied from said second delay circuit to said third divider circuit and said fifth divider circuit;
    an output of said first divider circuit and an output of said second divider circuit are applied to said first adder circuit so as to provide a first weighted video line which is applied to a second terminal of said switch;
    an output of said fourth divider circuit and an output of said fifth divider circuit are applied to said second adder circuit so as to provide a second weighted video line which is applied to said third terminal of said switch; and
    an output of said first divider circuit and an output of said third divider circuit are applied to said third adder circuit so as to provide a third weighted video line which is applied to said fourth terminal of said switch.

2. The vertical expander and filter apparatus of claim 1 wherein said first coefficient is ½, said second third coefficients are each ¾ and said fourth and fifth coefficients are each ½.

3. The vertical expander and filter apparatus of claim 1 wherein said switch is a commutator switch which cyclically produces an output of M+1 video lines from said first, second, third and fourth terminals respectively.

* * * * *